Patented June 7, 1932

1,861,696

UNITED STATES PATENT OFFICE

PHILIP E. HARTH, OF ST. LOUIS, MISSOURI, ASSIGNOR TO NATIONAL PIGMENTS & CHEMICAL COMPANY, OF ST. LOUIS, MISSOURI, A CORPORATION OF MISSOURI

COMPOSITION FOR THE TAKING OF X-RAYS

No Drawing. Application filed April 29, 1929. Serial No. 359,178.

This invention relates to a composition of the character employed for the taking of X-rays.

In the taking of X-rays, especially of the internal organs of the human body, it has been the practice to employ a suspension of a suspensoid base, such as barium sulphate, bismuth sulphate, etc., which base is stirred in a suitable liquid and taken internally, in order that the organs through which this suspension passes may be more readily emphasized on the X-ray picture. Where, however, such a suspensiod base is used, it tends to settle more or less rapidly from the suspension or liquid employed, with the result that the lower organs or parts thereof will show with maximum opacity, while the upper organs or parts may, indeed, show translucent. This tendency to settle out, moreover, results in a deposit of the suspensoid base in pockets in the viscera, where it is liable to cause irritation. A further effect of settling may be the stopping of the lower passages.

One of the objects of this invention, therefore, is to provide a composition for the taking of X-rays, in which the impervious ingredient is supplemented by an ingredient serving to keep the former in suspension.

Further objects will appear from the detail description, in which will be enumerated a number of illustrative embodiments of this invention; it is to be understood, however, that this invention is susceptible of various embodiments.

In accordance with this invention, the impervious ingredient is supplemented by an ingredient to keep the former in suspension. The impervious ingredient may be any of those commonly used, such as barium sulphate, bismuth sulphate, etc. As, however, the suspensiod particles, when in suspension, are subject to flocculation in order to keep them in suspension, a suitable suspending agent is mixed with the suspensiod base. There are a number of suspending agents which may be employed for this purpose, but one which is particularly suitable is a concentrated colloidal clay, which not only acts as a deflocculating agent but also as a lubricant and a mild laxative and is, otherwise, harmless. A colloidal clay which has been found particularly useful is one known as Bentonite the average sample of which has the following analysis:

| | |
|---|---|
| Silica | 62.43 |
| Alumina | 24.64 |
| Iron oxide | 3.20 |
| Calcium carbonate | 0.41 |
| Magnesium carbonate | 2.30 |
| Potassium carbonate | 0.15 |
| Sodium carbonate | 0.60 |
| Loss on ignition | 6.12 |

The physical analysis of such a sample is as follows:

| Division | Name | Diameter in millimeters | Per cent. |
|---|---|---|---|
| 1 | Medium sand | 1.0 -0.5 | None. |
| 2 | Sand | 0.5 -0.15 | 0.04 |
| 3 | Fine sand | 0.15 -0.075 | 0.41 |
| 4 | Very fine sand | 0.075 -0.033 | 2.02 |
| 5 | Silt | 0.033 -0.008 | 3.86 |
| 6 | Fine silt | 0.008 -0.003 | 2.23 |
| 7 | Very fine silt | 0.003 -0.0015 | 17.62 |
| 8 | Clay, finer than | -.0015 | 73.82 |

As an illustrative embodiment of this invention, barium sulphate of such a fineness as to pass 400 mesh is mixed dry with a concentrated colloidal clay as above described, in the proportion of about 92% of the former and 8% of the latter. To this can be added, if desired, any suitable ingredients to render it more palatable, such as small percentages of malted milk, sugar, or saccharin. The composition can be kept in a dry state and ready for use, when it can be mixed with a liquid and given to the patient in the usual doses.

It will, therefore, be seen that the invention accomplishes its objects. A composition is provided in which the suspensoid base is kept in suspension by the suspending agent. In view of the tenacity with which the composition remains in suspension, not only will the markings of the organs on the X-ray picture be of uniform opacity, with the same cross-section, but varying cross-sections will have varying opacities, which is desired in order that the true conditions may be observed. Moreover, the liability of settling of the suspensoid base in pockets in the viscera is eliminated, while the composition as a whole will pass through the system aided by the lubricating and laxative action of the colloidal clay.

While this invention is particularly applicable for the taking of X-rays of the internal organs, various other uses in this art will suggest themselves. It will, furthermore, be understood that certain features are of utility and may be employed without reference to other features; that is contemplated by and is within the scope of the appended claims. It is furthermore to be understood that various changes may be made in the composition, within the scope of the appended claims, without departing from the spirit of this invention. It is, therefore, to be understood that this invention is not to be limited to the specific ingredients and proportions described.

Having thus described the invention, what is claimed is:

1. A composition for the taking of X-rays, comprising, barium sulphate and a small percentage of a concentrated colloidal clay containing a high percentage of colloidal material.

2. A composition for the taking of X-rays, comprising, 92% barium sulphate and 8% of a concentrated colloidal clay containing a high percentage of colloidal material.

In testimony whereof I affix my signature this 5th day of April, 1929.

PHILIP E. HARTH.